United States Patent
Stanley et al.

(10) Patent No.: US 10,181,223 B2
(45) Date of Patent: Jan. 15, 2019

(54) SELECTING AND TRANSFERRING MATERIAL PROPERTIES IN A VIRTUAL DRAWING SPACE

(71) Applicant: MICROSOFT TECHNOLOGY LICENSING, LLC, Redmond, WA (US)

(72) Inventors: Mark Aaron Stanley, Worthing (GB); Alexander Charles Cullum, Maidenhead (GB); Jonathan Peter Creighton, London (GB); Matthew Elwyn Oliver Jones, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 16 days.

(21) Appl. No.: 15/382,211

(22) Filed: Dec. 16, 2016

(65) Prior Publication Data

US 2018/0114369 A1  Apr. 26, 2018

Related U.S. Application Data

(60) Provisional application No. 62/412,101, filed on Oct. 24, 2016.

(51) Int. Cl.
*G06T 19/00* (2011.01)
*G06T 19/20* (2011.01)
(Continued)

(52) U.S. Cl.
CPC ............ *G06T 19/20* (2013.01); *G06F 3/0482* (2013.01); *G06F 3/04815* (2013.01);
(Continued)

(58) Field of Classification Search
CPC ....... G06T 19/00; G06T 11/001; G06T 15/04; G06T 11/60; G06T 19/20; G09G 5/02;
(Continued)

(56) References Cited

U.S. PATENT DOCUMENTS 8,892,405 B1 * 11/2014 Michal .................... G06T 17/00
                                                              703/1
2005/0197800 A1   9/2005 Goodwin et al.
(Continued)

OTHER PUBLICATIONS

Nguyen, et al., "3D Material Style Transfer", In Proceedings of Eurographics, vol. 31, No. 2, 2012, 8 pages.
(Continued)

*Primary Examiner* — Ke Xiao
*Assistant Examiner* — Andrew Shin
(74) *Attorney, Agent, or Firm* — Shook, Hardy & Bacon LLP

(57) ABSTRACT

Aspects of the technology described herein provide for sampling the material properties of a source object within a virtual 3D drawing space, and then applying those properties to a target object within the drawing space. The material properties may include not only color, but also other physical properties like texture and sheen. For example, the way an object behaves in different lighting conditions may constitute a material property. According to aspects of the technology described herein, the manner in which an object behaves in lighting conditions, the shininess of the object, and the texture of the object may all be selected, sampled, and transferred to other target surfaces, such as a canvas or the surfaces of other objects, in the virtual 3D drawing space.

20 Claims, 6 Drawing Sheets

(51) Int. Cl.
*G06T 15/40* (2011.01)
*G06F 3/0481* (2013.01)
*G06F 3/0484* (2013.01)
*G06F 3/0482* (2013.01)

(52) U.S. Cl.
CPC ...... *G06F 3/04842* (2013.01); *G06F 3/04845* (2013.01); *G06T 2219/2012* (2013.01); *G06T 2219/2024* (2013.01)

(58) Field of Classification Search
CPC ..... G09G 5/06; G06F 3/0481; G06F 3/04812; G06F 3/04842; G06F 17/50
USPC ........ 345/419, 581, 582, 589, 593, 594, 619
See application file for complete search history.

(56) References Cited

U.S. PATENT DOCUMENTS

| | | | |
|---|---|---|---|
| 2008/0010041 A1* | 1/2008 | McDaniel | G06F 17/50 703/1 |
| 2011/0216001 A1 | 9/2011 | Song et al. | |
| 2012/0154439 A1 | 6/2012 | Ahn et al. | |
| 2015/0097862 A1* | 4/2015 | Reisner-Kollmann | G06T 19/006 345/633 |
| 2015/0242099 A1 | 8/2015 | Wallace et al. | |
| 2016/0042559 A1* | 2/2016 | Seibert | G06T 15/506 345/426 |
| 2016/0086377 A1 | 3/2016 | Mendez Mendez et al. | |
| 2016/0239986 A1 | 8/2016 | Mendez mendez et al. | |
| 2017/0103557 A1* | 4/2017 | Kumar | G06T 11/60 |
| 2017/0206700 A1* | 7/2017 | Munkberg | G06T 15/04 |

OTHER PUBLICATIONS

"Quick Tip 15—Blender—Copy / Paste / To Others Material", https://www.youtube.com/watch?v=1tWR6hHXYaU, Published on: Sep. 26, 2014, 2 pages.

Oskam, et al., "Fast and Stable Color Balancing for Images and Augmented Reality", In Proceedings of Second International Conference on 3D Imaging, Modeling, Processing, Visualization & Transmission, Oct. 13, 2012, pp. 4321-4328.

Magnenat, et al., "Live Texturing of Augmented Reality Characters from Colored Drawings", In IEEE Transactions on Visualization and Computer Graphics, Nov. 15, 2015, 10 pages.

"How to Copy Only selected Properties from Object A to Object B in illustrator", http://graphicdesign.stackexchange.com/questions/30734/how-to-copy-only-selected-properties-from-object-a-to-object-b-in-illustrator, Retrieved on: Nov. 7, 2016, 2 pages.

"Copying Colors from One Object to Another", https://zone.ni.com/reference/en-XX/help/371361K-01/lvhowto/copying_colors_from_one_ob/, Published on: Jun. 2013, 1 pages.

Chen, et al., "Stylistic indoor colour design via Bayesian network", In Journal of Computers & Graphics, vol. 60, Nov. 2016, 6 pages.

Wang, et al., "Color Transfer using Scattered Point Interpolation", In Proceedings of 10th International Conference on Virtual Reality Continuum and Its Applications in Industry, Dec. 11, 2011, pp. 163-170.

* cited by examiner

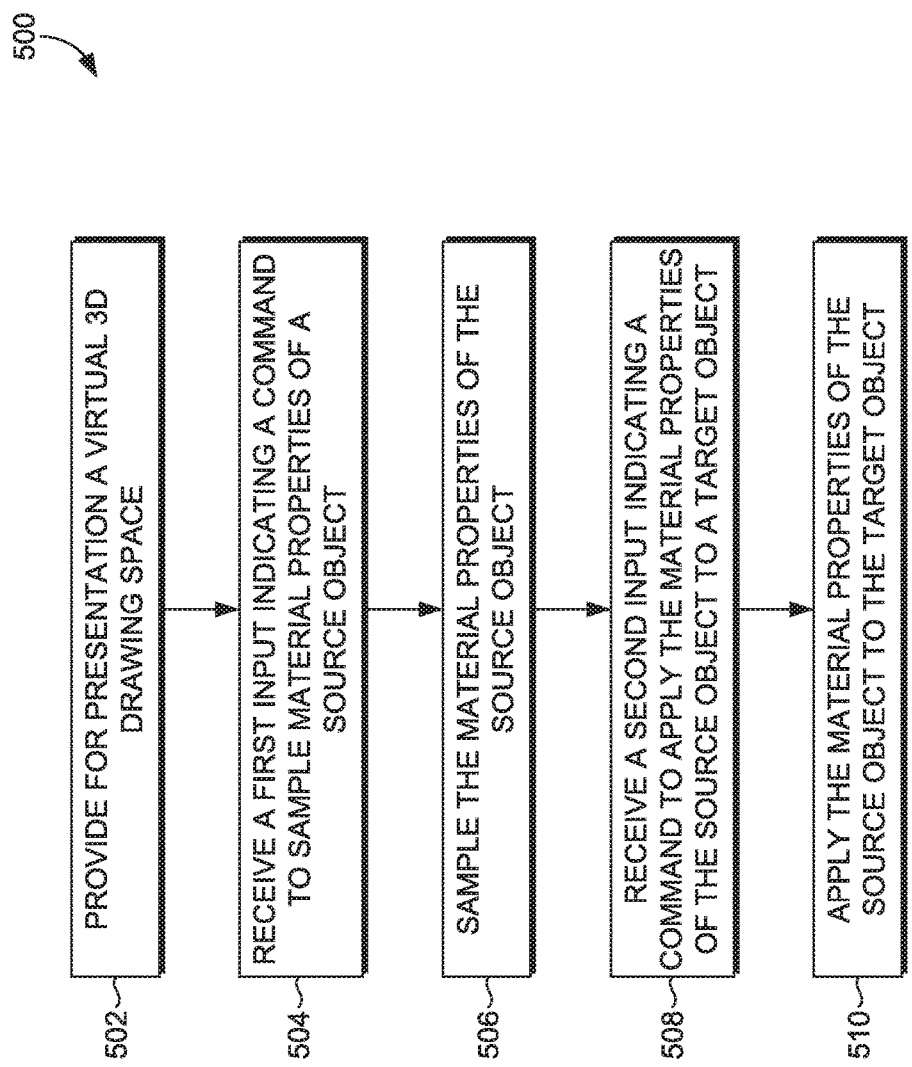

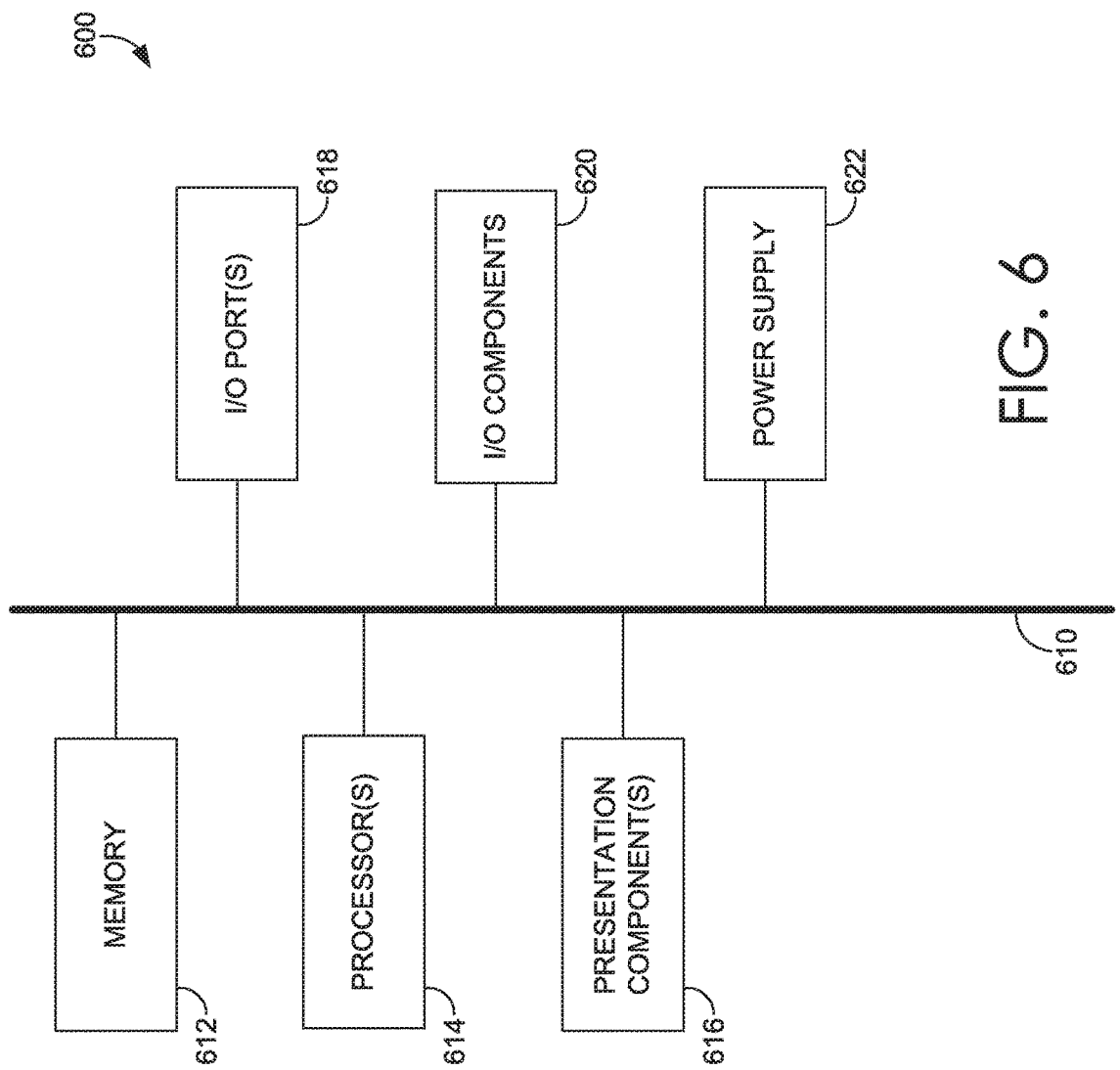

SELECTING AND TRANSFERRING MATERIAL PROPERTIES IN A VIRTUAL DRAWING SPACE

CROSS-REFERENCE TO RELATED APPLICATIONS

This application claims priority to U.S. Provisional Application Ser. No. 62/412,101, filed Oct. 24, 2016, entitled "Selecting and Transferring Material Properties in a Virtual Drawing Space," the disclosure of which is hereby incorporated by reference in its entirety.

BACKGROUND

Traditionally, colors available for selection in computer-aided design applications have a flat, non-reflective finish, and depicting the interplay between light and surfaces in a virtual drawing space involves complex graphics design.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide for sampling the material properties of a source object within a virtual two-dimensional ("2D") or three-dimensional ("3D") drawing space, and then applying those properties to a target object within the drawing space. The material properties may include not only color, but also other physical properties like texture and sheen. For example, the way an object behaves in different lighting conditions affects how the object looks in 3D space—this interaction with light constitutes a material property. According to aspects of the technology described herein, the manner in which an object behaves in lighting conditions, the shininess of the object, and the texture of the object may all be selected, sampled, and transferred to other target surfaces, such as a canvas or the surfaces of other objects, in the virtual 3D drawing space.

BRIEF DESCRIPTION OF THE DRAWINGS

Aspects of the disclosure are described in detail below with reference to the attached drawing figures, wherein:

FIG. 5 depicts a flow diagram of a method for transferring material properties of a source object to a target object in a virtual drawing space generated by a computer, in accordance with aspects of the present disclosure; and FIG. 6 is a block diagram of an exemplary computing environment suitable for use in implementing an aspect of the present disclosure.

DETAILED DESCRIPTION

Figure 1:
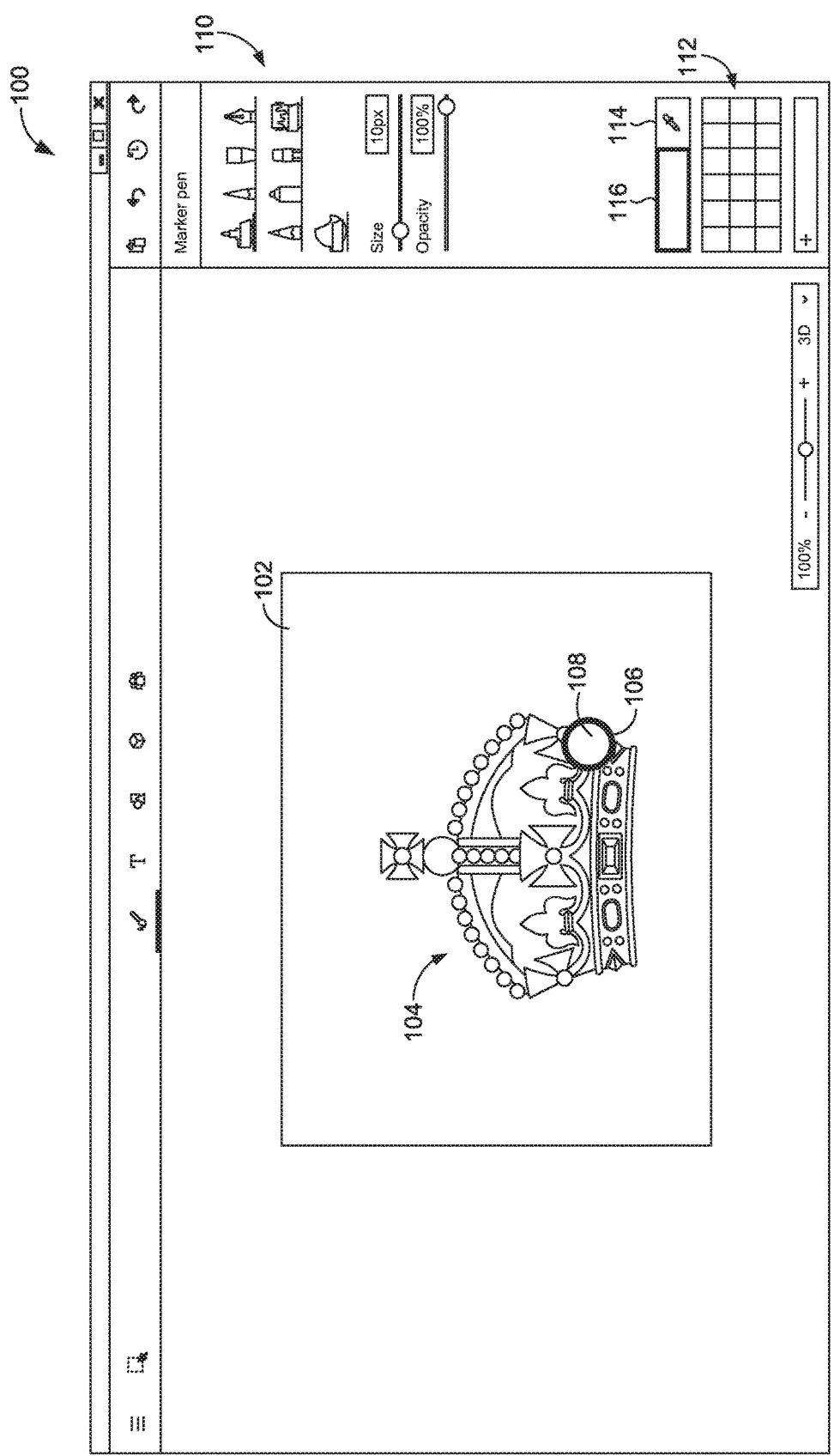
FIGS. 1-2 show exemplary user interfaces associated with a virtual drawing environment, wherein the material properties of a source object have been sampled, in accordance with aspects of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein provide for sampling the material properties of a source object within a virtual 3D drawing space, and then applying those properties to a target object within the drawing space. The material properties may include not only color, but also other physical properties like texture and sheen. For example, the way an object behaves in different lighting conditions affects how the object looks in 3D space—this interaction with light constitutes a material property. According to aspects of the technology described herein, the manner in which an object behaves in lighting conditions, the shininess of the object, and the texture of the object may all be selected, sampled, and transferred to other target surfaces, such as a canvas or the surfaces of other objects, in the virtual 3D drawing space.

Physically-based rendering ("PBR") is a method of rendering that provides a realistic representation of real-world materials. For example, compared to previous methods of rendering, PBR provides a more realistic depiction of the manner in which light interacts with various surfaces. Aspects of the technology described herein provide for sampling PBR materials within a virtual drawing space. Advantageously, the ability to sample PBR materials within a virtual drawing space and then apply the sampled materials to other objects in the drawing space enables a user to easily create an object that has desired material properties without the need for complex graphics design. For example, a user need not define the various properties that control how an object behaves in different lighting conditions within the drawing space; instead, the user simply samples a material that the user likes and applies the properties of that sampled material to other objects.

Turning now to FIG. 1, an exemplary user interface associated with a virtual drawing environment is provided. The virtual drawing space is generated by a computer and may be a 2D or 3D virtual drawing space. In one example, the virtual drawing space is associated with a drawing application.

The user interface 100 includes a canvas 102 on which a virtual object 104 has been created. In this instance, the virtual object 104 is a crown. The virtual object 104 may be a 2D or a 3D object. The user interface 100 also includes a toolbar 110. The toolbar 110 provides various tools for working in the virtual drawing space. For example, a user may select an artistic tool from a variety of options, including markers, pencils, ink pens, paintbrushes, and 3D input options. A user may also select a color from the color palette 112. The color palette 112 may include a number of predefined color options. The selected tool and the selected color may then be associated with user inputs in the virtual drawing space.

The toolbar 110 also includes a material selection tool that is represented by an eyedropper (or pipette) 114. In some instances, the material selection tool may be represented by other icons. The eyedropper 114 may be used to sample the properties of a material within the drawing space. For example, a user may first select the eyedropper 114 and then select a portion of an object within the drawing space, thus indicating a command to sample the selected portion of the object within the drawing space. Any object, including both 2D and 3D objects, may have its surface sampled. Both the surface color and other material properties of the source object may be sampled in this manner. The sampled material may then be applied to a target object in the drawing space. For example, if a user selects a paintbrush, the user may then paint the sampled material onto the target object. In this way, the target object receives both the color and the material properties of the source object.

In response to the user selection of the eyedropper 114, a selection indicator 106 may be provided for presentation within the user interface 100. As the user navigates throughout the drawing space (e.g., using a cursor), the selection indicator 106 may appear over the underlying portion of the crown 104 and include a window 108. The window 108 may provide a preview of the material that is available for sampling. This preview may take several different forms. In one example, the window 108 indicates the color of the material that is available for sampling, but does not indicate to a user that other properties may be sampled. Accordingly, a user may not realize that material properties other than color may be sampled. An additional indicator, such as a textual or other visual indicator, may be provided in order to alert a user that additional properties may be sampled and applied to another object in the drawing space. As will be discussed with respect to FIG. 2, in another example, the window 108 may provide a visual indication, such as a gradient, that properties in addition to color may be sampled.

After navigating the drawing space with the eyedropper 114 and the associated selection indicator 106, a user may provide an input indicating a command to sample a selected portion of the crown 104. In response to receiving such input, a color bar 116 in the toolbar 110 may display an indication of the sampled material, thus signaling to the user that the selected portion has been sampled. For example, the color bar 116 and the window 108 may have the same or a similar appearance. The preceding discussion is exemplary only. In some instances, the user interface 100 may include the window 108 and not the color bar 116, while in other instances, the user interface may include the color bar 116 and not the window 108. The user interface 100 includes both the window 108 and the color bar 116.

In the example shown in FIG. 1, a user has selected a portion of the crown 104, thus indicating a command to sample the selected portion of the crown 104. If a gold portion of the crown 104 is selected, then the sampled properties may include a gold color, a particular shine, a metallic appearance, and other indicators of the manner in which the selected portion of the crown 104 interacts with light. These properties are then available for application to another object within the drawing space. Thus, the user may cause another object in the drawing space to interact with light in the same manner in which the selected portion of the crown interacts with light.

Figure 2:
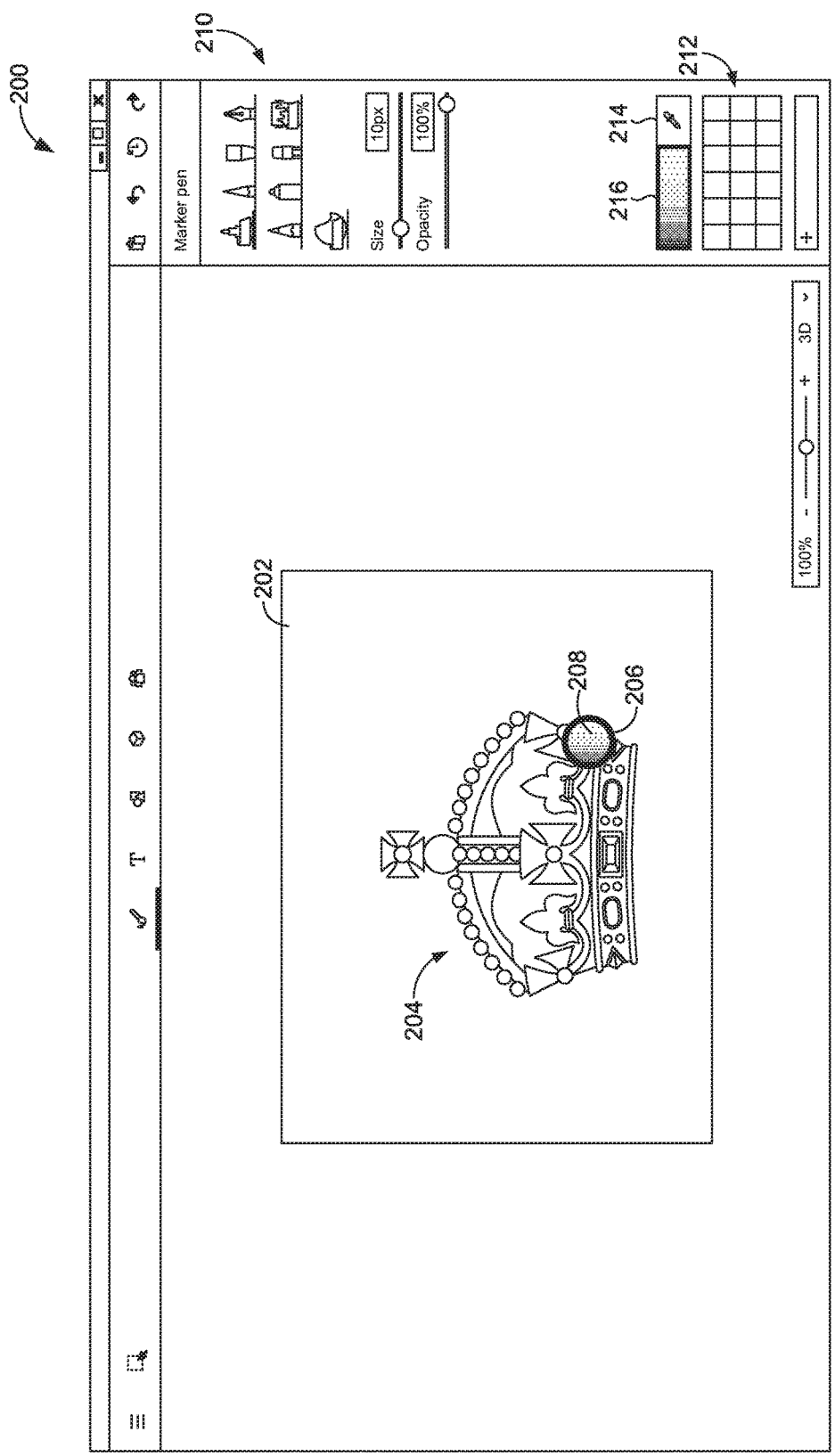

Turning now to FIG. 2, an exemplary user interface 200 is provided, which shares many similarities with the user interface 100 of FIG. 1. For example, the user interface 200 includes a toolbar 210 and a canvas 202 on which an object 204 has been created. The toolbar includes a color palette 212, an eyedropper 214, and a color bar 216. The user interface 200 also includes a selection indicator 206 and a window 208. These items may be similar to the corresponding items discussed with respect to FIG. 1. In FIG. 2, however, in the window 108, which provides a preview of the material that has been sampled, a color gradient is displayed. The same color gradient is displayed in the color bar 216. This color gradient may provide an indication to the user that not only the color, but other material properties of a particular object within the drawing space have been sampled and may be applied to another object in the drawing space.

Figure 3:
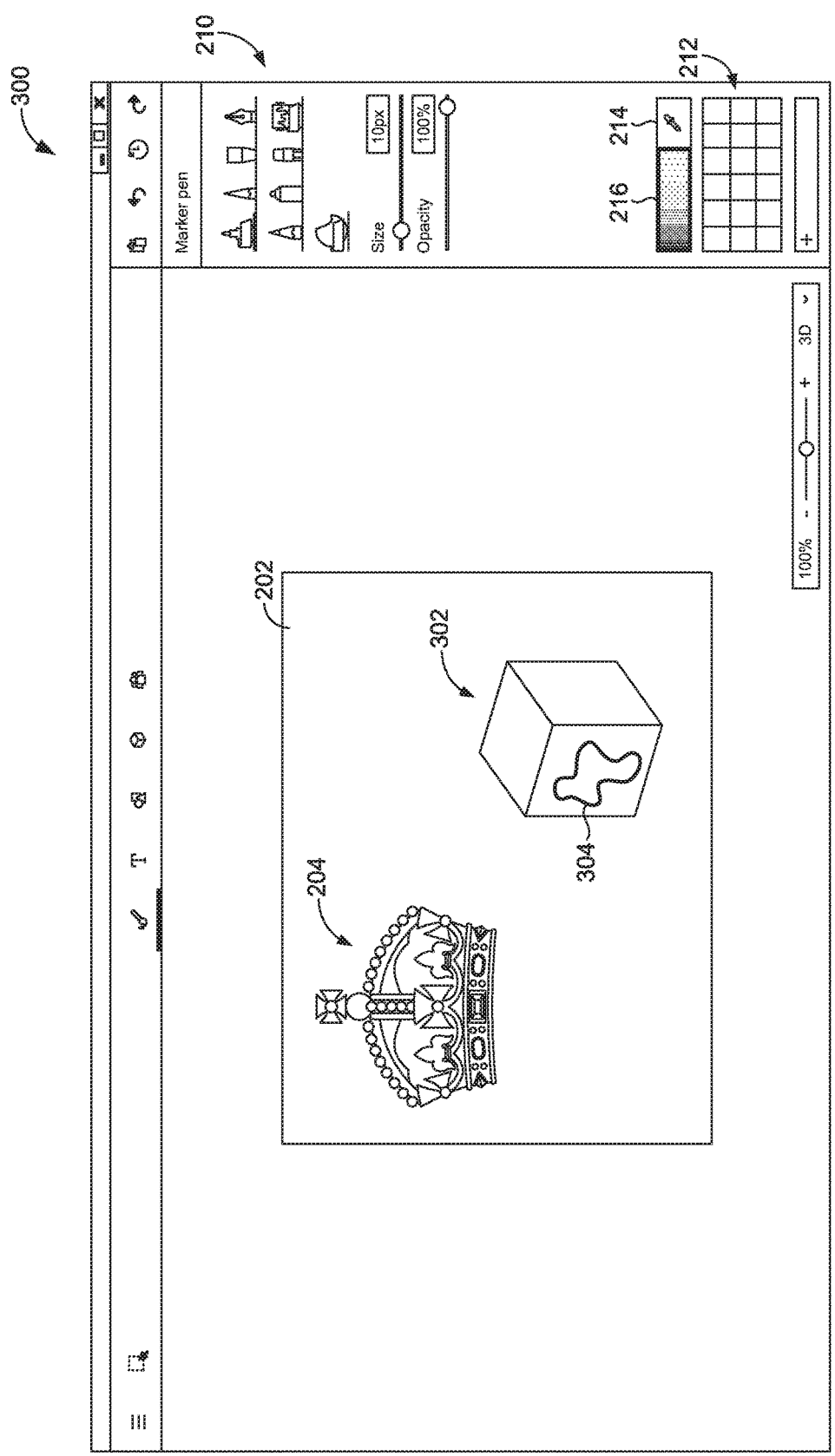
FIG. 3 shows an exemplary user interface associated with a virtual drawing environment, wherein the material properties of a source object have been transferred to a target object, in accordance with aspects of the present disclosure.

For example, in the user interface 300 of FIG. 3, the crown 204 is the source object, and the cube 302 is the target object. As discussed with respect to FIG. 2, a portion of the surface of the crown 204 has been sampled. The color gradient in the color bar 216 indicates that both the color and other material properties of the crown 204 have been sampled. The sampled material properties from the crown 204 may be applied to the cube 302, as illustrated by the applied paint 304. In this way, the portion of the cube 302 that is covered by the applied paint 304 may be the same or similar in appearance to the sampled portion of the crown 204. For example, the painted portion of the cube may be gold in color, have a particular shine and a metallic appearance, and may interact with light in the same manner in which the sampled portion of the crown 204 interacts with light. Thus, the crown 204 and the painted portion of the cube 302 may have the same material properties.

Notably, in one example, the color gradient displayed in the window 208 and/or the color bar 216 does not correspond to the appearance of the applied paint 304. Instead, the color gradient may serve as a cue to the user that the eyedropper has been used to sample not only the color, but also other material properties of a particular surface, and that these material properties are now available for transfer. The appearance of the applied paint 304 corresponds to the appearance of the sampled surface, which is not necessarily related to the gradient displayed in the window 208 and/or the color bar 216. In other examples, the preview displayed in the window 208 and/or the color bar 216 does correspond to the appearance of the applied paint 304. In other words, the sampled portion of the source object, the window 208 and/or the color bar 216, and the applied paint 304 may all match in appearance.

The ability to sample material properties of an object in the manner discussed above may involve at least seven technical values, including: diffuse red ("R"), green ("G"), and blue ("B") values; specular R, G, and B values; and a gloss value. In one example, when a user selects a portion of a source object with an eyedropper tool, the diffuse RGB, specular RGB, and gloss values are recorded. The user may then uses that material to paint over a target object, thereby overriding the values associated with the target object with the recorded values for the source object. In some instances, these technical values are not exposed to users, but are instead represented in a user interface for the virtual drawing space as choices that are readily understood and selected by users. As discussed above with respect to FIG. 1, the XAML user interface may show only the diffuse RGB values in the window 108 and/or the color bar 116. Thus, the user may not realize that the user has picked a metallic color until it is applied to a target object. Additional features may enable a user to apply only the diffuse RGB values to the target object without the other material properties. As discussed with respect to FIG. 2, in order to provide some indication to the user that material properties (in addition to flat color and/or diffuse RGB values) have been sampled, a gradient may be overlaid onto the diffuse RGB color values displayed in the window 208 and/or the color bar 116. In some instances, after the eyedropper 214 has been selected and a user begins navigating the drawing environment (e.g., moving a cursor around the drawing environment), the selection indicator 206 may provide a preview of the underlying material that may be sampled. Thus, when the window 208 displays only diffuse RGB values without a gradient overlay, that may provide an indication that only a flat color (without additional material properties) is available for sampling, but when the window 208 displays diffuse RGB color values with a gradient overlay, that may provide an indication that the underlying surface has both color and additional material properties available for sampling.

In one example, the default paint in the virtual drawing space may be behave like physical paint, such that it has its own values for diffuse RGB, specular RGB, and gloss and it does not inherit these values from the surface on which the paint is being applied. Accordingly, in this example, if a user paints over a model having a varnished wood material with default paint at an opacity of 100%, then the varnished wood material values are overwritten by the values of the paint. This recreates the effect of painting over a real, physical wooden surface with thick poster paint. In the virtual drawing space, the user may preserve some of the appearance of the original material by using a paint having a lower opacity. But even in this instance, the paint may not inherit properties from the surface on which the paint is being applied.

Figure 4:
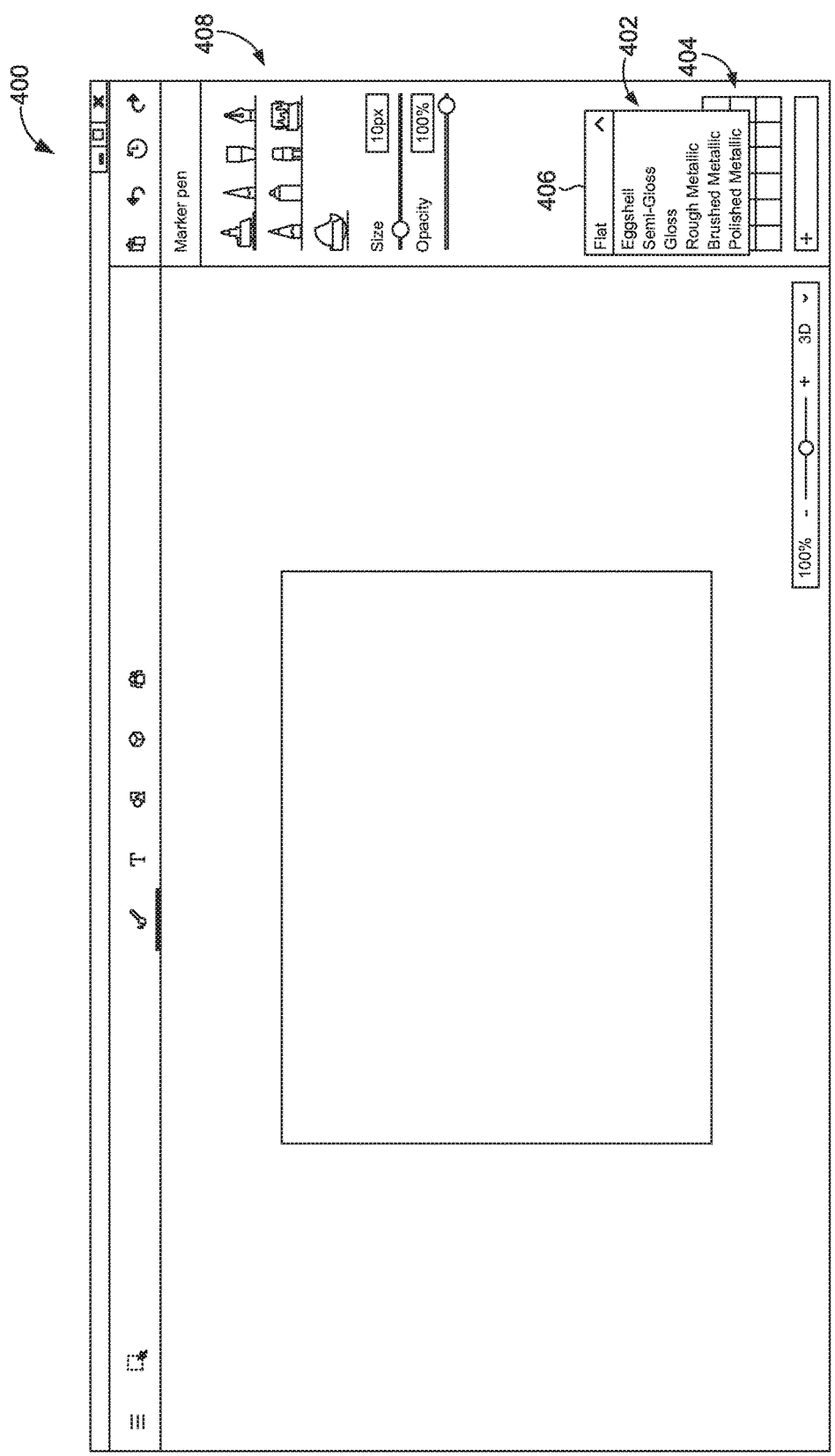
FIG. 4 shows a view of a user interface associated with a virtual drawing environment, in accordance with aspects of the present disclosure.

In addition to the material sampling discussed above, aspects of the technology described herein may facilitate a user defining a custom material. For example, the user interface 400 of FIG. 4 includes a toolbar 408 having a dropdown menu 402. The dropdown menu 402 includes a list of preset materials. Thus, a user may not only select an RGB value from the color palette 404, but may also select a material from the dropdown menu 402. The preset materials may correspond to recognizable terms from the physical world, such as paint finishes (e.g., flat, eggshell, semi-gloss, and gloss) and hardware finishes (e.g., rough metallic, brushed metallic, polished metallic). Each of these preset materials may correspond to a particular combination of specular RGB and gloss values. The diffuse RGB values may be provided by a user's color selection from the color palette 404. Thus, the user interface 400 may correlate a concept that is difficult for users to understand (a particular combination of diffuse RGB, specular RGB, and gloss values) to a concept that is easy for users to understand (a particular finish that the user might encounter at the hardware store).

In one example, if a user utilizes the eyedropper to sample the material properties of an object that was created in the drawing application, the drawing application may determine whether the material properties of the object correspond to one of the preset materials included in the dropdown menu 402. If so, the appropriate material may be displayed in the material bar 406. If the sampled object is an imported object (i.e. was not created in the drawing application) and the material properties of the object do not correspond to one of the preset materials include in the dropdown menu 402, then the material bar 406 may read "Custom." A color bar (not pictured) in the toolbar 408 may display a gradient in order to indicate that a custom material has been sampled. In one example, a user may change the "Custom" material type to one of the preset material types. In this example, the diffuse RGB values of the sampled material may continue to define the color, but the specular RGB and gloss values may be adjusted based on the selected preset material type. In some instances, the diffuse RGB values may be adjusted based on the specular RGB values to ensure that the user gets the color that the user expects to see (e.g., an object that appears to be gold may have a black diffuse color, and the yellow tones may instead come from the specular values—if a user changes this gold material to a flat preset material, the resulting color should not be defined solely by the diffuse RGB values, in which case the object would be black, but instead should be defined based on a combination of the diffuse and specular RGB values in order to provide a color that is gold).

The dropdown menu 402 may also include detail textures (e.g., wood). A preset material for a detail texture may be associated with a preset ID, such that when the preset material is sampled with the eyedropper, the drawing application recognizes that the sampled material includes detail texture. Normals, geometry, and other properties may be handled in a similar manner. Normals correspond to unit length vectors stored in a 2D map that allow a rendering algorithm to calculate how light would interact at the surface without more geometry information than needed. Geometry corresponds to vector information modeled to simulate 3D positional information that can be represented by Euler's geometrical mathematical formula. In simple terms, geometry corresponds to positions in 3D space.

FIG. 5 includes a flow diagram of a method 500 for transferring material properties of a source object to a target object in a virtual drawing space generated by a computer, in accordance with aspects of the present disclosure. Method 500 could be performed by a computing device, such as computing device 600 in FIG. 6. The computing device can take the form of a laptop computer, a personal computer with detached display, a tablet computer, a smart phone, a holographic display, a virtual reality headset, an augmented reality headset, or some combination of the above or similar devices.

At step 502, a virtual drawing space, such as a 2D or 3D drawing space, is provided for presentation. This may include generating the 2D or 3D drawing space (e.g., by a computer application) and outputting the drawing space for display. The virtual 3D drawing space may be displayed in 3D, using stereoscopic technology, or other techniques that provide a three-dimensional appearance to the display. The virtual 3D drawing space can also be displayed in 2D with various camera angles used to depict the 3D space. The 3D drawing space may include a 3D source object and a 3D target object.

At step 504, a first input indicating a command to sample the material properties of the source object is received. This input may be received when a user contacts the source object with a cursor. The cursor may be controlled by a mouse, touchscreen input (e.g., stylus, finger), trackball, gaze detection, head movement, voice control, gestures, or other input techniques. In one aspect, the selection occurs when the cursor contacts the source object and a second input, such as a mouse click, is provided. As an alternative to a cursor, the source object may be selected via voice control, keyboard, or other mechanism. The first user input may include a selection of a portion of a surface of the source object. This selection may be accomplished via the eyedropper tool discussed above.

At step 506, in response to the first input, the material properties of the source object are sampled. The sampled material properties may include a color and at least one other material property. In another example, the sampled material properties may include a color, a shininess, and a texture of a surface of the source object in the 3D drawing space. In another example, the material properties represent an interaction between a light source and a surface of the source object in the 3D drawing space. The sampling may include determining and/or recording diffuse RGB values, specular RGB values, and gloss values for the source object and/or a selected portion of the surface of the source object.

At step 508, a second input indicating a command to apply the material properties of the source object to a target object is received. In response, at step 510, the material properties of the source object are applied to the target object. Applying the material properties of the source object to the target object may comprise overwriting values associated with the target object with the diffuse RGB values, specular RGB values, and gloss values that were recorded for the source object and/or the selected portion of the source object.

In an example, the method 500 may further include receiving a selection of a material selection tool, and, in response, providing for presentation a selection indicator comprising a window. As the selection indicator is manipulated within the virtual 3D drawing space (e.g., as a cursor is moved around within the virtual 3D drawing space), the window may provide a preview of material properties that are available for sampling. In order to assist a user in selecting a source object or portion thereof to sample, this preview may be provided before a user actually selects the source object or portion thereof. Subsequent to selecting the source object or a portion thereof, the window may provide a representation of the material properties that have been sampled.

A first visual configuration of the window may indicate that the only material property that is available for sampling and/or that has been sampled is color (e.g., that only diffuse RGB values are available for sampling and/or have been sampled). A second visual configuration of the window may indicate that material properties in addition to color are available for sampling and/or have been sampled (e.g., that specular RGB values and gloss values are available for sampling and/or have been sampled). The first visual configuration may be different from the second visual configuration. For example, the first visual configuration may comprise a representation of diffuse RGB values without a gradient overlay, while the second visual configuration may comprise a representation of diffuse RGB values with a gradient overlay, wherein the diffuse RGB values are associated with the source object or portion thereof underlying the selection indicator ad/or the source object or portion thereof that has been selected for sampling. Additionally, the second visual configuration may be different in appearance from the selected portion of the source object. For example, the second visual configuration may include a gradient overlay to indicate that material properties other than color are available for sampling and/or have been sampled, but the selected portion of the source object, itself, may not include a gradient overlay.

Having described various implementations, an exemplary computing environment suitable for implementing aspects of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of aspects of the disclosure. Neither should the computing device 600 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some aspects of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of transferring material properties of a three-dimensional (3D) source object to a 3D target object in a virtual 3D drawing space generated by a computer, the method comprising:
   providing for presentation the virtual 3D drawing space, the virtual 3D drawing space including the 3D source object and the 3D target object;
   providing for presentation a material selection indicator comprising a window, wherein a location of the window corresponds to a location of a cursor in the virtual 3D drawing space, and wherein when the cursor is located over the 3D source object, the window provides a preview of the material properties of the 3D source object that are available for sampling at the location of the cursor;
   receiving a first input indicating a command to sample the material properties of the 3D source object at the location of the cursor, the first input comprising a selection of a portion of a surface of the 3D source object, the portion of the surface of the 3D source object having a color, a texture, and a shininess;
   in response to the first input, sampling the material properties of the portion of the surface of the 3D source object, the material properties comprising the color, the texture, and the shininess;
   receiving a second input indicating a command to apply the material properties of the portion of the surface of the 3D source object to the 3D target object; and
   in response to the second input, applying the material properties of the portion of the surface of the 3D source object to the 3D target object.

2. The method of claim 1, wherein sampling the material properties of the portion of the surface of the 3D source object comprises determining diffuse RGB values, specular RGB values, and gloss values for the portion of the surface of the 3D source object.

3. The method of claim 2, wherein applying the material properties of the 3D source object to the 3D target object comprises overwriting values associated with the 3D target object with the diffuse RGB values, specular RBG values, and gloss values for the portion of the surface of the 3D source object.

4. The method of claim 1, wherein the material properties represent an interaction between a light source and the portion of the surface of the 3D source object in the 3D drawing space.

5. The method of claim 1, further comprising:
receiving a selection of a material selection tool; and
in response, providing for presentation the material selection indicator comprising the window.

6. The method of claim 5, wherein the window provides a preview of material properties that are available for sampling as the material selection indicator is manipulated within the virtual 3D drawing space.

7. The method of claim 6, wherein a first visual configuration of the window indicates that the only material property available for sampling is color and a second visual configuration of the window indicates that material properties in addition to color are available for sampling, wherein the first visual configuration is different from the second visual configuration.

8. The method of claim 7, wherein the first visual configuration comprises a representation of diffuse RGB values without a gradient overlay and the second visual configuration comprises a representation of the diffuse RGB values with the gradient overlay, wherein the diffuse RGB values are associated with the portion of the surface of the 3D source object.

9. The method of claim 7, wherein the second visual configuration is different in appearance from the portion of the surface of the 3D source object.

10. The method of claim 1, wherein a first visual configuration of the window indicates that the only material property available for sampling is color and a second visual configuration of the window indicates that material properties in addition to color are available for sampling, wherein the first visual configuration comprises a representation of diffuse RGB values without a gradient overlay in the window and the second visual configuration comprises a representation of the diffuse RGB values with the gradient overlay in the window.

11. A computer system comprising:
one or more processors; and
one or more computer storage media storing computer-executable instructions that, when executed by the one or more processors, are configured to implement a method comprising:
providing for presentation a virtual three-dimensional (3D) drawing space, the virtual 3D drawing space including a 3D source object and a 3D target object;
providing for presentation a material selection indicator comprising a window, wherein a location of the window corresponds to a location of a cursor in the virtual 3D drawing space, and wherein when the cursor is located over the 3D source object, the window provides a preview of material properties of the 3D source object that are available for sampling at the location of the cursor;
receiving a first input indicating a command to sample material properties of the 3D source object at the location of the cursor, the first input comprising a selection of a portion of a surface of the 3D source object, the portion of the surface of the 3D source object having a shininess;
in response to the first input, sampling the material properties of the portion of the surface of the 3D source object, the material properties comprising the shininess;
receiving a second input indicating a command to apply the material properties of the portion of the surface of the 3D source object to the 3D target object; and
in response to the second input, applying the material properties of the portion of the surface of the 3D source object to the 3D target object.

12. The computer system of claim 11, wherein sampling the material properties of the portion of the surface of the 3D source object comprises recording diffuse RGB values, specular RGB values, and gloss values for the portion of the surface of the 3D source object.

13. The computer system of claim 12, wherein applying the material properties of the 3D source object to the 3D target object comprises overwriting values associated with the 3D target object with the diffuse RGB values, specular RGB values, and gloss values for the portion of the surface of the 3D source object.

14. The computer system of claim 11, further comprising, in response to receiving a selection of a material selection tool, providing for presentation the material selection indicator comprising the window.

15. The computer system of claim 14, wherein the window provides a preview of material properties that are available for sampling as the material selection indicator is manipulated within the virtual 3D drawing space.

16. The computer system of claim 15, wherein a first visual configuration of the window indicates that the only material property available for sampling is color and a second visual configuration of the window indicates that material properties in addition to color are available for sampling, wherein the first visual configuration is different from the second visual configuration.

17. The computer system of claim 16, wherein the second visual configuration is different in appearance from the portion of the surface of the 3D source object.

18. One or more computer storage media having computer-executable instructions embodied thereon that, when executed by a computing device having a processor and a memory, cause the computing device to perform a method for transferring material properties of a three-dimensional (3D) source object to a 3D target object in a virtual 3D drawing space generated by the computing device, the method comprising:
at a processor of the computing device, providing for presentation the virtual 3D drawing space, the virtual 3D drawing space including the 3D source object and the 3D target object;
providing for presentation a material selection indicator comprising a window, wherein a location of the window corresponds to a location of a cursor in the virtual 3D drawing space, and wherein when the cursor is located over the 3D source object, the window provides a preview of the material properties of the 3D source object that are available for sampling at the location of the cursor;
receiving a first input indicating a command to sample the material properties of the 3D source object at the location of the cursor, the first input comprising a selection of a portion of a surface of the 3D source object, the portion of the surface of the 3D source object having a shininess;
in response to the first input, sampling the material properties of the portion of the surface of the 3D source object, the material properties comprising the shininess;
receiving a second input indicating a command to apply the material properties of the portion of the surface of the 3D source object to the 3D target object; and in response to the second input, applying the material properties of the portion of the surface of the 3D source object to the 3D target object.

19. The one or more computer storage media of claim 18, wherein sampling the material properties of the portion of the surface of the 3D source object comprises determining diffuse RGB values, specular RGB values, and gloss values for the portion of the surface of the 3D source object.

20. The one or more computer storage media of claim 19, wherein applying the material properties of the 3D source object to the 3D target object comprises overwriting values associated with the 3D target object with the diffuse RGB values, specular RGB values, and gloss values for the portion of the surface of the 3D source object.

* * * * *